United States Patent
Tang et al.

(10) Patent No.: US 11,046,615 B2
(45) Date of Patent: Jun. 29, 2021

(54) SELF-HEALING MATRIX FOR A CERAMIC COMPOSITE

(71) Applicant: United Technologies Corporation, Farmington, CT (US)

(72) Inventors: Xia Tang, West Hartford, CT (US); James T. Beals, West Hartford, CT (US); Richard Wesley Jackson, Groton, CT (US); Ying She, East Hartford, CT (US); Andrew J. Lazur, Laguna Beach, CA (US); Kathryn S. Read, Marlborough, CT (US); Mary Colby, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/226,143

(22) Filed: Dec. 19, 2018

(65) Prior Publication Data

US 2020/0199026 A1 Jun. 25, 2020

(51) Int. Cl.
*C04B 35/571* (2006.01)
*C04B 35/628* (2006.01)
*C04B 41/50* (2006.01)
*C04B 41/45* (2006.01)
*C04B 41/52* (2006.01)

(52) U.S. Cl.
CPC ...... *C04B 35/571* (2013.01); *C04B 35/62863* (2013.01); *C04B 41/5059* (2013.01); *C04B 2235/3826* (2013.01); *C04B 2235/428* (2013.01); *C04B 2235/5244* (2013.01); *C04B 2235/5418* (2013.01)

(58) Field of Classification Search
CPC .............................................. C04B 2235/5418
See application file for complete search history.

(56) References Cited

U.S. PATENT DOCUMENTS 5,580,643 A * 12/1996 Kennedy ........... C04B 35/62852
428/212
5,962,103 A 10/1999 Luthra et al.
5,965,266 A * 10/1999 Goujard ................ C04B 35/806
427/228

(Continued)

FOREIGN PATENT DOCUMENTS

WO WO-2016060712 A1 * 4/2016 ............... B24D 3/28

OTHER PUBLICATIONS

"Mangesana, N. et al. The Effect of Particle Sizes and Solids Concentration on the Rheology of Silica Sand Based Suspensions. . ." J. S. Afr. Inst. Min. Metallurgy, vol. 108, No. 4, pp. 237-243. (Year: 2008).*

(Continued)

*Primary Examiner* — Alison L Hindenlang
*Assistant Examiner* — Andrés E. Behrens, Jr.
(74) *Attorney, Agent, or Firm* — Kinney & Lange, P.A.

(57) ABSTRACT

A method for forming a self-healing ceramic matrix composite (CMC) component includes depositing a first self-healing particulate material in a first region of a CMC preform of the CMC component and depositing a second self-healing particulate material having a different chemical composition than the first self-healing particulate material in a second region of the CMC preform distinct from the first region.

12 Claims, 3 Drawing Sheets

(56) References Cited

U.S. PATENT DOCUMENTS

| | | | |
|---|---|---|---|
| 6,521,005 B1* | 2/2003 | Vincent | B24D 3/28 |
| | | | 51/294 |
| 6,579,636 B2 | 6/2003 | Oguri et al. | |
| 6,759,117 B2 | 7/2004 | Bauer et al. | |
| 9,126,873 B2* | 9/2015 | Diss | C04B 41/5089 |
| 9,440,888 B2 | 9/2016 | Bouillon et al. | |
| 9,512,044 B2 | 12/2016 | Lazur et al. | |
| 9,650,303 B2 | 5/2017 | Chamberlain et al. | |
| 2011/0200748 A1* | 8/2011 | Eberling-Fux | C04B 35/571 |
| | | | 427/249.2 |
| 2014/0273681 A1* | 9/2014 | Chamberlain | C04B 35/16 |
| | | | 442/1 |
| 2015/0008613 A1* | 1/2015 | Bouillon | C04B 41/5024 |
| | | | 264/232 |
| 2019/0337859 A1* | 11/2019 | Mendez | C04B 35/62873 |

OTHER PUBLICATIONS

Funk, James E. Predictive Process Control of Crowded Particulate Suspensions Applied to Ceramic Manufacturing, ser. 978-1-4615-3118-0, Springer, 1994. p. 282-283 (Year: 1994).*

Funk, James E. Predictive Process Control of Crowded Particulate Suspensions Applied to Ceramic Manufacturing, ser. 978-1-4615-3118-0, Springer, 1994. p. 68 (Year: 1994).*

"Sieve." Wikipedia, Wikimedia Foundation, Jul. 17, 2017, https://web.archive.org/web/20170717182521/https://en.wikipedia.org/wiki/Sieve (Year: 2017).*

D. L. Poerschke, et al., "Yttrium Bearing Silicon Carbide Matrices for Robust Ceramic Composites", from J. Am. Ceram. Soc., pp. 1-9 (2012).

Extended European Search Report for EP Application No. 19217686.5, dated May 13, 2020, 9 pages.

* cited by examiner

SELF-HEALING MATRIX FOR A CERAMIC COMPOSITE

BACKGROUND

The present disclosure relates generally to ceramic matrix composites (CMCs) and, more particularly, to a method of manufacturing ceramic matrix composite components for use in gas turbine engines.

Lightweight CMC is a highly desirable material for gas turbine engine applications. CMCs exhibit excellent physical, chemical, and mechanical properties at high temperatures and are particularly suited for producing hot section components for gas turbine engines. CMCs can be fabricated by a variety of methods. In one known method, chemical vapor infiltration (CVI) is used to form a silicon carbide (SiC) matrix for densification of a ceramic fiber preform. Due to the slow process of vapor infiltration, large pores can form between fibers and fibers plies in the SiC matrix. While environmental barrier coatings (EBCs) can be used to protect CMCs, spallation of the EBC over time can expose the underlying CMC to corrosive gases. Cracks that form in the CMC can open existing pores providing passages for oxidative gases. A damaged EBC and cracks and open pores in the matrix can lead to fiber oxidation, increased recession rate, and a shorted component service life.

A need exists to accelerate the rate of matrix densification, while improving matrix properties to protect the component from environmental damage.

SUMMARY

In one aspect, a method for forming a self-healing ceramic matrix composite (CMC) component includes depositing a first self-healing particulate material in a first region of a CMC preform of the CMC component and depositing a second self-healing particulate material having a different chemical composition than the first self-healing particulate material in a second region of the CMC preform distinct from the first region.

In another aspect, a ceramic matrix composite (CMC) component comprises a first region comprising deposits of a first self-healing particulate material and a second region distinct from the first region and comprising deposits of a second self-healing particulate material having a different chemical composition than the first self-healing particulate material.

The present summary is provided only by way of example, and not limitation. Other aspects of the present disclosure will be appreciated in view of the entirety of the present disclosure, including the entire text, claims and accompanying figures.

Figure 1A:
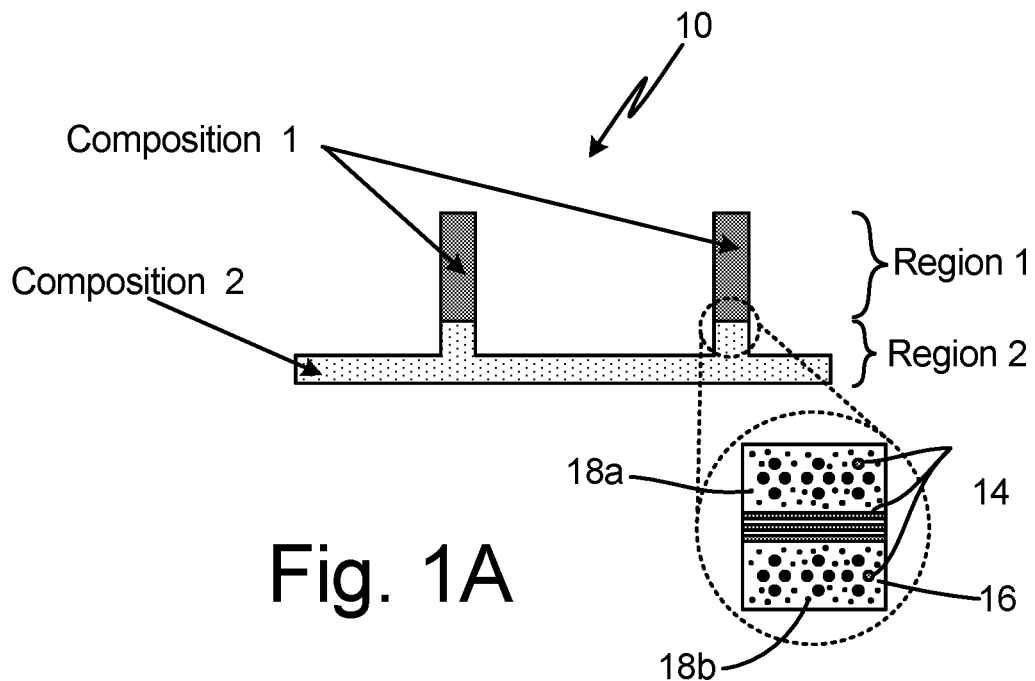
FIGS. 1A and 1B are cross-sectional schematic views of components formed from a ceramic matrix composite (CMC) having tailored distributions of varying types of self-healing additives.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

The incorporation of self-healing additives into a CMC matrix can mitigate oxidation and recession problems resulting from a damaged EBC or matrix. The self-healing matrix can be fabricated using a hybrid densification process including CVI and slurry infiltration. Self-healing compounds can be introduced into a fiber preform or fiber plies by depositing self-healing particulate materials through slurry infiltration. The combined use of CVI and slurry infiltration can accelerate CMC matrix densification and reduce the number of large pores formed with CVI alone. The self-healing additives can have different chemical compositions and can be selectively located in the CMC matrix to meet specific functional needs of the CMC (i.e., sealing cracks in the matrix and regenerating an EBC) during operation.

Figure 1B:
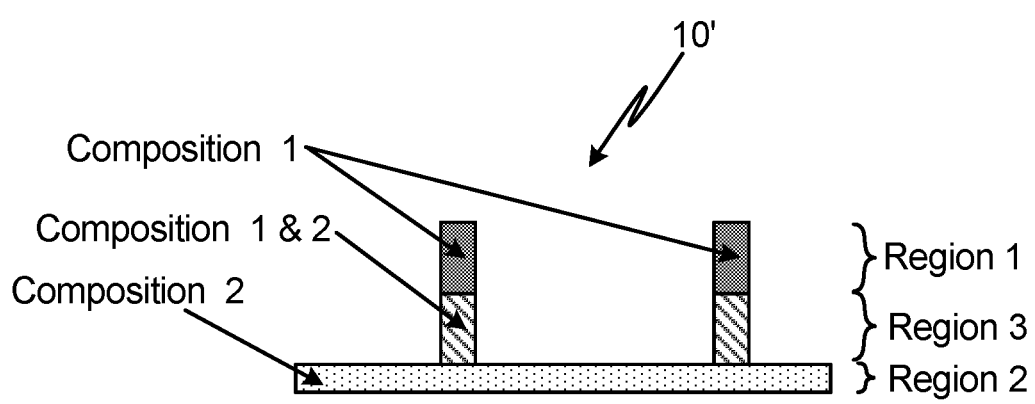
Figure 2A:
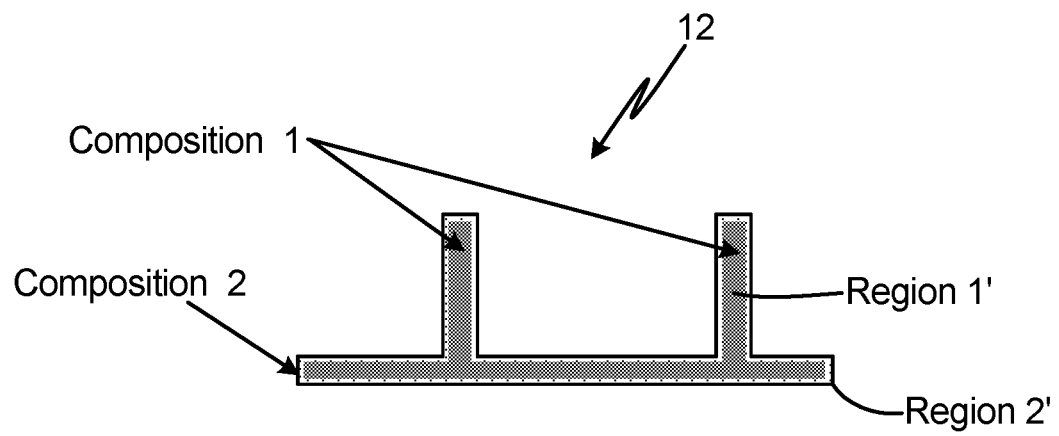
FIGS. 2A and 2B are cross-sectional schematic views of alternative embodiments of components formed from a ceramic matrix composite (CMC) having tailored distributions of varying types of self-healing additives.
Figure 2B:
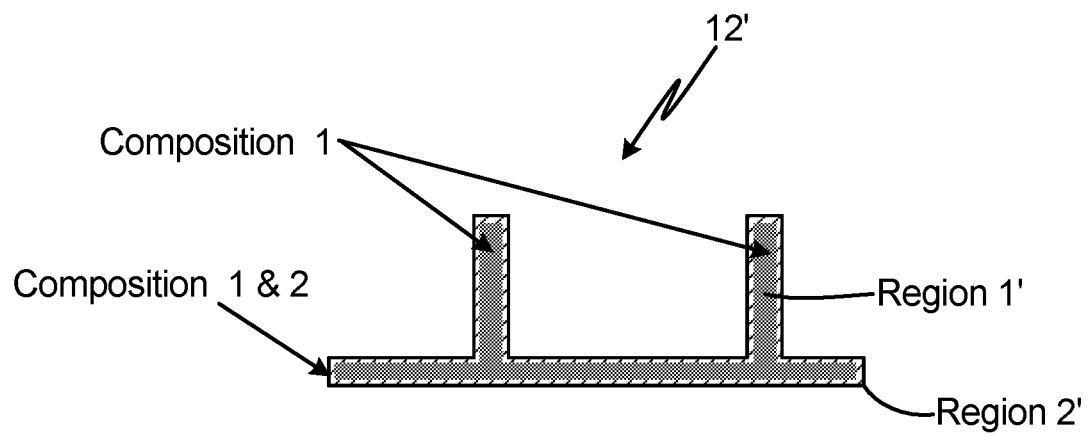
Figures 3A, 3B:
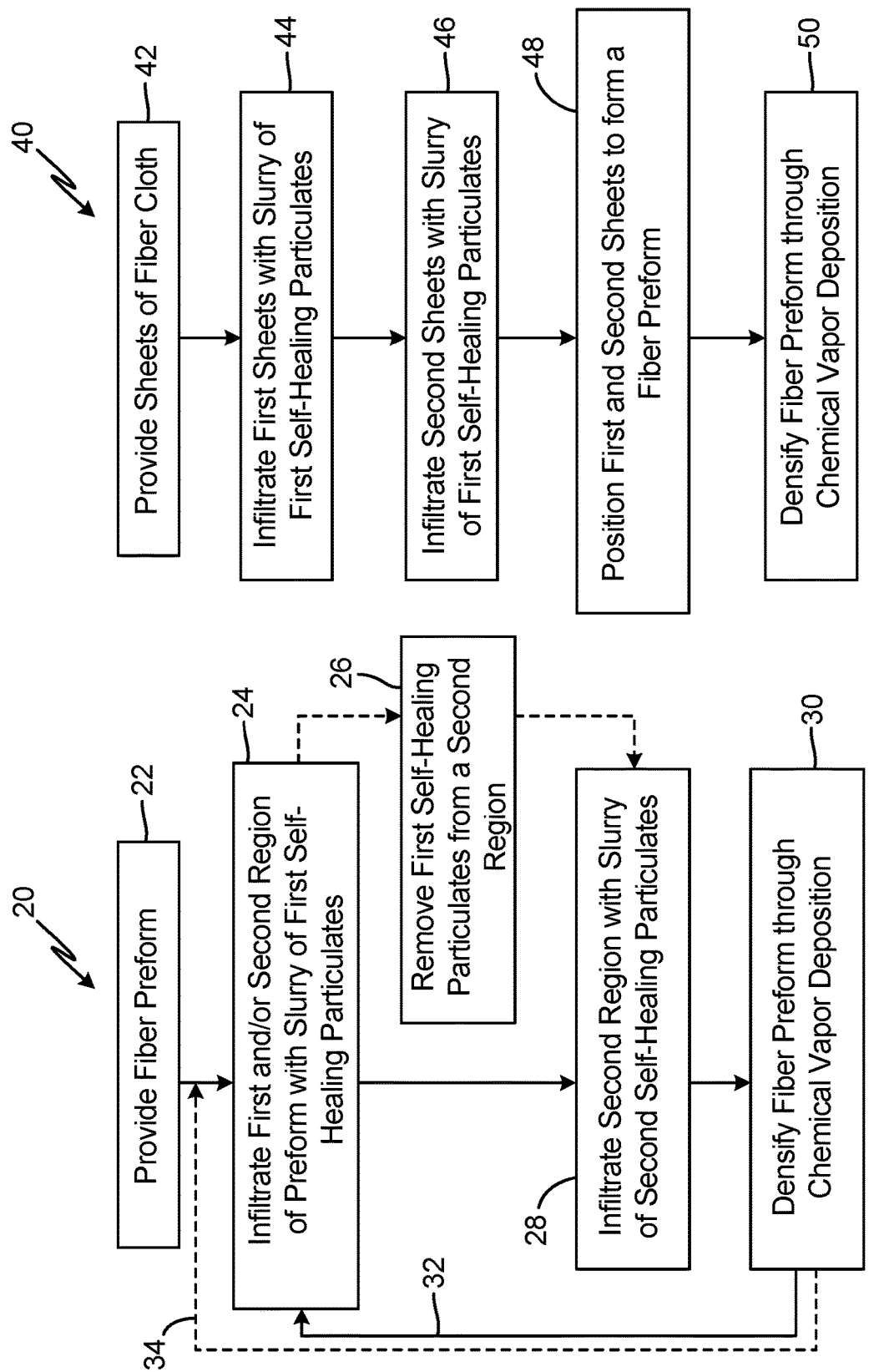
FIG. 3A is a method flowchart illustrating a process for forming the components of FIGS. 1A, 1B, 2A, and 2B.
FIG. 3B is a method flowchart illustrating an alternative process for forming the components of FIGS. 1A, 1B, 2A, and 2B.

FIGS. 1A and 1B are cross-sectional schematic views of components 10 and 10', respectively. Components 10, 10' are formed from a CMC having tailored distributions of varying types of self-healing additives. FIGS. 2A and 2B are cross-sectional schematic views of components 12 and 12', respectively, which are formed from CMC having tailored distributions of varying types of self-healing additives. FIG. 3A is a method flowchart illustrating a process for forming the components 10, 10', 12, 12' of FIGS. 1A, 1B, 2A, and 2B. FIG. 3B is a method flowchart illustrating an alternative process for forming the components 10, 10', 12, 12' of FIGS. 1A, 1B, 2A, and 2B. As used herein, the term "self-healing additives" refers to two categories of compounds, including borides, that can form a boron oxide upon oxidation and react with silica to form borosilicate glass capable of sealing cracks in the matrix, and borides, silicides, oxides, and carbides that can form silicate upon oxidation and migrate to the surface of the CMC to regenerate a damaged EBC. The methods disclosed herein can be used to disperse self-healing additives throughout the matrix and to selectively deposit or locate the self-healing additives, based on their self-healing function, in different regions of the component. For example, compounds capable of regenerating the EBC can be selectively deposited near the surface of the CMC, while compounds capable of filling cracks can be substantially uniformly distributed throughout the matrix.

FIGS. 1A, 1B, 2A, and 2B illustrate schematic cross-sectional views of components 10, 10', 12, 12', which are each examples of a blade outer air seal (BOAS) for use in a turbine section of a gas turbine engine. The BOAS was selected for illustrative purposes only and is intended merely to provide an example of a component that can be fabricated from CMC. It will be understood by one of ordinary skill in the art that the methods disclosed herein can be used in the fabrication of other components and are by no means limited to the manufacture of a BOAS. In other embodiments, components 10, 10', 12, 12' can be, for example, a blade, vane, or combustion liner as known in the art, or any other CMC component in a gas turbine engine.

Components 10, 10', 12, 12' can each be formed from a fiber-based ceramic preform containing fibers or fiber tows, which can be woven, non-woven, or selectively placed. Exemplary fiber materials can include silicon carbide (SiC), carbon (C), silicon oxycarbide (SiOC), silicon nitride ($Si_3N_4$), silicon carbonitride (SiCN), hafnium carbide (HfC), tantalum carbide (TaC), silicon borocarbonitride (SiBCN), and silicon aluminum carbon nitride (SiAlCN). A matrix can be formed from a mixture of SiC and self-healing additives through a hybrid densification process including both CVI and slurry infiltration. In some embodiments, CVI can additionally be used to apply interface coatings (e.g., boron nitride) to fibers prior to matrix densification. Interfacial coatings can help prevent matrix cracking from penetrating fibers and help protect against environmental degradation in corrosive environments.

In the CVI process, a gaseous ceramic precursor, for example, methyl trichlorosilane (MTS), and a carrier gas (e.g., hydrogen (H2)) diffuse into the porous preform, where the MTS reacts to form SiC. The SiC is deposited inside the pores on the surface of the preform thereby densifying the preform with a SiC matrix. CVI is a slow process and can result in the formation of large internal matrix pores, formed as outer pores are filled and block gas diffusion deeper into the preform. In slurry infiltration, SiC and self-healing particulates can be directly deposited in the preform, which can significantly accelerate the densification process and reduce the number of large pores formed. Particulates can be spherical or irregularly shaped powders. The size of particulate materials can be tailored to ensure sufficient material deposition in all parts of the preform. For example, slurries of smaller particles can be used initially to reach the core of the preform, followed by slurries of larger particles. In some embodiments, particle radii can range in size from 0.25 microns for smaller particles up to 45 microns for large particles. Particles can be monomodal, bimodal or trimodal with respect to particle size distribution in the slurry. The CVI and slurry infiltration processes can be used repeatedly and in an alternating fashion in the fabrication process as needed to achieve a desired matrix densification. In some embodiments, the densification process can begin with CVI, followed by slurry infiltration. In alternative embodiments, slurry infiltration can be used prior to CVI for matrix densification. The addition of self-healing particulates can increase the surface area for CVI deposits, which may increase the rate of CVI densification. It can be preferable to use CVI in the final matrix densification step to ensure all accessible pores have been filled.

SiC and self-healing additives can be delivered to the preform as particulate materials in a liquid slurry. The liquid slurry can be poured or injected into the preform. In some embodiments, the preform can be dipped to allow pickup of the SiC and self-healing particulate materials and the liquid. In other embodiments, a combination of methods can be used to deliver the slurry to the preform in alternative steps or to different locations of the preform. The liquid can be water or aqueous-based, or an alcohol- or solvent-based non-aqueous fluid that is chemically compatible with the preform and the SiC and self-healing additives. The liquid can be removed through a single or iterative vacuum and/or drying process prior to densification of the preform. In some embodiments, self-healing particulate materials can be mixed with a preceramic polymer to produce a polymer slurry, which can be delivered to the preform. The preceramic polymer can be retained in the preform and converted to a ceramic matrix phase after thermal processing in a manner consistent with polymer infiltration and pyrolysis (PIP) techniques. The polymer slurry can be delivered to the preform in a manner similar to the aforementioned liquid slurry. In some embodiments, both liquid and polymer slurries can be used to deliver SiC and self-healing additives to the preform. The slurry infiltration process can be conducted at normal pressure or can be vacuum- or pressure-assisted.

Both liquid slurry and polymer slurry infiltration processes can be conducted multiple times to achieve a desired amount and distribution of self-healing particulates in the preform. In some embodiments, the matrix can comprise up to 25 percent self-healing particulate material by volume. Preferably, the matrix can comprise between 5 and 15 percent self-healing particulate material by volume; however, it may be desirable to have a matrix comprising as low as 0.5 percent or as high as 25 percent self-healing particulate material by volume in certain applications. In some embodiments, the concentration of self-healing additives in the matrix can be substantially uniform throughout the component matrix. In other embodiments, the concentration of the self-healing additives can vary depending on the location in the component. For example, the concentration of self-healing additives can be tailored to account for temperature variations in the component. Self-healing additives near a surface or hot side of the component can be exposed to higher temperatures, which can facilitate more rapid self-healing due to higher diffusion rates and reaction rates. As such, a lower concentration of self-healing additives may be sufficient for healing cracks and regenerating the EBC. In contrast, self-healing additives located in an inner region or on a cold side of the component can be exposed to lower temperatures, which can slow mass transport thereby requiring a higher concentration of self-healing additives in the matrix to heal a crack. Generally, for slurry infiltration of SiC and self-healing particulate materials, the total particulate material in the slurry can comprise up to 30 percent self-healing additives by volume with a remainder of SiC to achieve a matrix composition of up to 25 percent self-healing additives. Preferably, the total particulate material in the slurry can comprise between 10 and 20 percent self-healing additives by volume, but can be as low as 0.5 percent and as high as 30 percent in some embodiments. The concentration of the self-healing additives in the slurry can be varied to produce the desired matrix composition. Delivery of self-healing additives in liquid and/or polymer slurries can provide for controlled and substantially uniform distribution of the self-healing additives thereby enhancing the self-healing capabilities of the matrix during operation.

In some embodiments, a slurry containing self-healing particulate material, alone or in combination with SiC particulates or a preceramic polymer, can be applied to a fiber ply or sheet (e.g. fiber cloth) prior to the preform layup process. Each fiber ply can be immersed in the slurry to coat the fibers prior to layup and thereby allow for selective placement of the self-healing additives in the preform as the preform is being built. In some embodiments, the distribution and type of self-healing additives can be tailored for each ply and thereby each region of component 10, 10', 12, 12'.

FIGS. 1A, 1B, 2A, and 2B illustrate varying embodiments of selective deposition or location of self-healing additives in components 10, 10', 12, 12'. The two categories of self-healing additives are illustrated as Composition 1 and Composition 2. Composition 1 compounds can react upon exposure to oxygen to form compounds capable of sealing cracks in the matrix and Composition 2 compounds can react upon exposure to oxygen to regenerate the EBC. Composition 1 can include silicon boride, boron carbide, silicon borocarbide, silicon boronitrocarbide, aluminum nitride and mixtures thereof. Composition 2 can include borides of rare earth elements, hafnium boride, zirconium boride, titanium boride, tantalum boride, silicides of rare earth elements, hafnium silicide, zirconium silicide, titanium silicide, tantalum silicide, molybdenum disilicide, aluminum oxide, alkaline earth oxides, oxides of rare earth elements, hafnium oxide zirconium oxide and mixtures thereof. The selection of Composition 1 and Composition 2 compounds can be tailored based on local operating temperatures of different regions of the component to facilitate reaction and optimal glass formation. In some embodiments, multiple compounds can be selected for each of Composition 1 and Composition 2 slurries and can be selectively distributed to improve the self-healing capacity of the matrix. Composition 1 and Composition 2 compounds can retain their chemical composition through the CMC fabrication process and until exposed to environmental contaminants. During operation, CMC components 10, 10', 12, 12' can be exposed to high temperatures and corrosive environments. Over time, EBCs protecting an outer surface of components 10, 10', 12, 12' can spall off and cracks can form in the matrix, allowing for passage of oxidative gases. Composition 1 and Composition 2 compounds can react upon exposure to oxygen to form compounds capable of sealing cracks in the matrix and regenerating the EBC, respectively.

Composition 1 compounds can form boron oxides when exposed to oxidative gases entering matrix cracks. The boron oxides can react with silica ($SiO_2$) formed by the reaction of matrix SiC with oxidative gases to form a low viscosity borosilicate glass. The borosilicate glass can flow to fill or seal cracks and thereby prevent further passage of oxidative gases into the matrix. Composition 1 compounds can be deposited throughout the matrix. A substantially uniform distribution of Composition 1 compounds throughout the matrix can help ensure that any cracks that form in the matrix will provide access to Composition 1 compounds. Boron oxide and borosilicate glass have a higher rate of evaporation at temperatures greater than 2500° F. (1371° C.) and, therefore, preferred use of these compounds can be in the low temperature regions in CMC components 10, 10', 12, 12'.

In addition to boron oxide and borosilicates, Composition 2 compounds can form rare earth metal oxides or other metal oxides upon oxidation. The oxides react with silica to form rare earth silicates or other metal silicates, which have a low evaporation rate at high temperatures. Composition 2 compounds, therefore, can be located in regions exposed to high temperatures in CMC components 10, 10', 12, 12' for enhanced robustness. The silicates have a high affinity for oxygen and a tendency to migrate toward the surface of the CMC component in the presence of aluminum oxide or alkaline earth oxides, forming a predominantly silicate layer. The silicate layer formation on the CMC surface can effectively regenerate the EBC and reduce recession rate for a damaged EBC by providing an effective barrier to water vapor diffusion. Composition 2 compounds can be selectively located or deposited close to the surface of the CMC component for ease of environmental protection.

FIG. 1A illustrates component 10 with Regions 1 and 2. In the non-limiting example of the BOAS provided, Region 2, which is exposed to the hot gas path in the gas turbine engine, can be exposed to higher temperatures than Region 1. As illustrated, Composition 2 compounds can be deposited or selectively located on the hot side (Region 2) of component 10 and along the surface where an EBC would typically be present to limit corrosion of the component. Composition 1 compounds can be deposited or selectively located in Region 1 of component 10 to seal cracks in the matrix that may form during operation. FIG. 1A includes an exploded schematic cross-sectional view of Regions 1 and 2, illustrating fibers 14, matrix 16, and self-healing particulates 18a and 18b, denoting the distribution of Composition 1 and Composition 2 compounds, respectively. Self-healing particulates of Compositions 1 and 2 can be selectively located in component 10 by infiltrating Region 1 of the preform with a slurry containing Composition 1 particulates and infiltrating Region 2 of the preform with a slurry containing Composition 2 particulates. Slurry infiltration to Regions 1 and 2 can be repeated as necessary to achieve a desired volume of self-healing material in the matrix and can be repeated using particles of different sizes. As previously discussed, slurry infiltration steps can also be alternated with CVI to achieve a desired matrix densification. The infiltration can be controlled by varying the liquid carrier, the size of particulates, the amount of particulates in the slurry and viscosity of the slurry, geometric position of the infiltration, temperature, and pressure, among other factors known in the art. In alternative embodiments, component 10 can be formed from prepreg fiber plies containing Composition 1 particulates and prepreg fiber plies containing Composition 2 particulates. The prepreg fiber plies can be selectively arranged in the layup process to form Regions 1 and 2 of component 10.

FIG. 1B is an alternative embodiment of component 10 shown in FIG. 1A. FIG. 1B illustrates component 10', which includes Regions 1 and 2 as described with respect to component 10, with the addition of Region 3 located between Regions 1 and 2. Region 3 can include a combination of both Composition 1 particulates and Composition 2 particulates. The self-healing compounds of Compositions 1 and 2 can be selectively located in component 10' by infiltrating Regions 1 and 3 of the preform with a slurry containing Composition 1 particulates and infiltrating Regions 2 and 3 of the preform with a slurry containing Composition 2 particulates. Slurry infiltration can be conducted as described with respect to the fabrication of component 10. In alternative embodiments, component 10' can be formed from prepreg fiber plies containing Composition 1 particulates, prepreg fiber plies containing Composition 2 particulates, and prepreg fiber plies containing a combination of Composition 1 and Composition 2 particulates. The prepreg fiber plies can be selectively arranged in the layup process to form Regions 1, 2, and 3 of component 10'. The distribution and volume of Composition 1 and Composition 2 particulates in Region 3 can be tailored to provide for EBC regeneration while improving the matrix self-healing capabilities near the surface of component 10'.

FIG. 2A illustrates component 12 with Regions 1' and 2'. Region 2' forms the external surface of component 12, while Region 1' defines an internal core of component 12. Self-healing additives of Compositions 1 and 2 can be selectively located in component 12 by infiltrating an entirety of the preform, including both Regions 1' and 2', with a slurry containing Composition 1 particulates. The Composition 1 slurry can then be removed from Region 2' of the preform (i.e., the outer surface) and the entirety of the preform can be infiltrated in Region 2' with a slurry of Composition 2 particulates. Composition 1 particulates, including SiC particulates delivered in the slurry, can be removed from the surface of the preform by blasting with high pressure water, localized ultrasonic removal techniques, partial immersion in an ultrasonic bath, and the like. In some non-limiting embodiments, the slurry of Composition 1 can be removed from approximately 0.040 inches (1 millimeter). Slurry infiltration can be conducted as described with respect to the fabrication of component 10. In some embodiments, a slurry infiltration of Composition 1 particulates can be performed multiples times to densify the core (Region 1') before slurry infiltration with Composition 2 particulates is performed. Additionally or alternatively, particle size can be selected to limit penetration of Composition 2 into the core. In alternative embodiments, component 12 can be formed from prepreg fiber plies containing Composition 1 particulates and prepreg fiber plies containing Composition 2 particulates. The prepreg fiber plies can be selectively arranged in the layup process to form Regions 1' and 2' of component 12.

FIG. 2B is an alternative embodiment of component 12 shown in FIG. 2A. FIG. 2B illustrates component 12', which includes Regions 1' and 2' as described with respect to component 12. In component 12', both Composition 1 and Composition 2 particulates can be located in Region 2' thereby enhancing matrix healing properties near the surface of component 12', while Region 1 contains Composition 1 particulates. The self-healing compounds of Compositions 1 and 2 can be selectively located in component 12' by infiltrating an entirety of the preform, including both Regions 1' and 2', with a slurry containing Composition 1 particulates. The preform can then be dried before infiltrating the preform with a slurry of Composition 2 particulates. The preform can be immersed in a volume of slurry of Composition 2 particulates and capillary forces can pull the slurry into the pore structure. Particle size can be selected to limit penetration depth to the desired level within Region 2' (e.g., approximately 0.040 inches (1 millimeter) in some applications). Slurry infiltration can be conducted as described with respect to the fabrication of component 10. In some embodiments, a slurry infiltration with Composition 1 particulates can be performed multiples times to densify the core (Region 1') before slurry infiltration with Composition 2 particulates is performed. In alternative embodiments, component 12 can be formed from prepreg fiber plies containing Composition 1 particulates, prepreg fiber plies containing Composition 2 particulates, and prepreg fiber plies containing a mixture of Composition 1 and Composition 2 particulates. The prepreg fiber plies can be selectively arranged in the layup process to form Regions 1' and 2' of component 12'. The distribution and volume of Composition 1 and Composition 2 particulates in Region 2' can be tailored to provide for EBC regeneration while improving the matrix self-healing capabilities near the surface of component 12'.

FIG. 3A is a method flowchart illustrating a process 20 for forming the components 10, 10', 12, 12' of FIGS. 1A, 1B, 2A, and 2B. In process 20, a fiber preform can be provided in step 22 for matrix densification. Region 1 and/or Region 2 of the fiber preform can be infiltrated with a slurry containing self-healing particulate material in step 24. In some embodiments, a slurry of Composition 1 compounds can be provided to Region 1 alone (FIG. 1A). In other embodiments, an entirety of the preform, including both Regions 1 and 2 can be infiltrated with the slurry of Composition 1 particulates. In optional step 26, the portion of the Composition 1 particulates deposited in Region 2 can be removed via blasting, ultrasonic removal techniques, and the like, and Region 2 can then be infiltrated with a slurry of Composition 2 particulates in step 28 (FIG. 2A). In other embodiments, the preform can be dried after infiltration with the slurry of Composition 1 particulates, allowing Composition 1 compounds to remain deposited in Region 2. Region 2 can then be infiltrated with a slurry of Composition 2 particulates in step 28 to provide a mixture of Composition 1 and Composition 2 self-healing compounds to Region 2' (as illustrated in FIG. 2B). As previously discussed, particle sizes can be selected to limit infiltration of Composition 2 particulates into Region 1 of the preform during step 28. In some embodiments (as illustrated in FIG. 1A), Region 1 can be selectively infiltrated with Composition 1 particulates in step 24 and Region 2 can be selectively infiltrated with Composition 2 particulates in step 28 to form distinct regions of the component defined by different self-healing properties. In other embodiments, slurry infiltration with Composition 1 particulates and Composition 2 particulates can partially overlap to form a third region (Region 3, as illustrated in FIG. 1B) having both self-healing functions. In some embodiments, the Composition 1 additives can comprise two to 30 percent of the total particulate material by volume of the Composition 1 slurry, and preferably can comprise five to 15 percent of the total particulate material by volume. The Composition 2 additives can generally comprise five to 30 percent of the total particulate material by volume of the Composition 2 slurry, and preferably ten to 20 percent of the total particulate material by volume. As previously discussed, steps 24 and 28 can be repeated as necessary and with different particle sizes to achieve a desired distribution of self-healing particulate material in the matrix.

The fiber preform can be further densified using CVI in step 30. The processes of slurry infiltration and CVI can be conducted in alternating fashion and can be repeated multiple times, as indicated by step 32, to achieve a desired matrix densification. In some embodiments, CVI can be conducted prior to slurry infiltration, as indicated by step 34, to provide an interface coating to the fibers and/or to provide initial matrix densification. In some embodiments, CVI can be replaced or used in conjunction with other known methods of densification, including PIP.

FIG. 3B is a method flowchart illustrating an alternative process 40 for forming the components of FIGS. 1A, 1B, 2A, and 2B. In process 40, a plurality of sheets or plies of fiber cloth can be provided in step 42. Each ply can be infiltrated with a slurry of Composition 1 particulates (step 44), Composition 2 particulates (step 46), or a combination thereof (not shown) to provide plies pre-impregnated with the self-healing particulate material. Each fiber ply can then be selectively positioned in the layup process to form Regions 1, 1', 2, 2', 3 of the component (step 48). The fiber preform can then be densified using CVI or other suitable matrix densification process as known in the art (step 50).

The selective and tailored incorporation of self-healing additives into a CMC matrix can mitigate oxidation and recession problems resulting from a damaged EBC or matrix. The self-healing additives can be selectively located in the CMC matrix to meet specific functional needs of the CMC (i.e., sealing cracks in the matrix and regenerating an EBC) during operation. Self-healing phases can be introduced into a fiber preform or fiber plies by depositing self-healing particulate materials through slurry infiltration, which can accelerate CMC matrix densification and can reduce the number of large pores formed with CVI alone.

SUMMATION

Any relative terms or terms of degree used herein, such as "substantially", "essentially", "generally", "approximately"

and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

DISCUSSION OF POSSIBLE EMBODIMENTS

The following are non-exclusive descriptions of possible embodiments of the present invention.

A method for forming a self-healing ceramic matrix composite (CMC) component according to an exemplary embodiment of this disclosure, among other possible things includes depositing a first self-healing particulate material in a first region of a CMC preform of the CMC component and depositing a second self-healing particulate material having a different chemical composition than the first self-healing particulate material in a second region of the CMC preform distinct from the first region.

The method of the preceding paragraph can optionally include, additionally and/or alternatively, any one or more of the following features, configurations, additional components, and/or steps:

A further embodiment of the foregoing method, wherein the first self-healing particulate material is selected from a group consisting of silicon boride, boron carbide, silicon borocarbide, silicon boronitrocarbide, and mixtures thereof.

A further embodiment of any of the foregoing methods, wherein the second self-healing particulate material is selected from a group consisting of borides of rare earth elements, hafnium boride, zirconium boride, titanium boride, tantalum boride, silicides of rare earth elements, hafnium silicide, zirconium silicide, titanium silicide, tantalum silicide, molybdenum disilicide, aluminum oxide, alkaline metal oxides, oxide of rare earth elements and mixtures thereof.

A further embodiment of any of the foregoing methods, wherein the first region can comprise an inner core of the CMC preform, and wherein the second region can comprise an outer region of the CMC preform including an outer surface of the CMC preform.

A further embodiment of any of the foregoing methods can further include depositing the first self-healing particulate material in the second region.

A further embodiment of any of the foregoing methods, wherein the first region can be located on a first side of the CMC preform and wherein the second region can be located on a second side opposite the first side of the CMC preform, and wherein the second side of the CMC preform can be configured for use in a high temperature environment and wherein the first side of the CMC preform can be configured for use in a lower temperature environment.

A further embodiment of any of the foregoing methods can further include depositing the first and second self-healing particulate materials in a third region of the CMC preform located between the first and second regions of the CMC preform.

A further embodiment of any of the foregoing methods, wherein the CMC preform can be a fiber structure having the first and second regions and wherein depositing the first and second self-healing particulate materials in the CMC preform can include infiltrating the fiber structure with a first slurry comprising the first self-healing particulate material and infiltrating the fiber structure with a second slurry comprising the second self-healing particulate material.

A further embodiment of any of the foregoing methods, wherein the entire fiber structure can be infiltrated with the first slurry and wherein the method further comprises removing the first slurry from the second region before infiltrating the fiber structure with the second slurry.

A further embodiment of any of the foregoing methods, wherein the entire fiber structure can be infiltrated with the first slurry and dried before infiltrating the fiber structure with the second slurry.

A further embodiment of any of the foregoing methods, wherein a size of the second self-healing particulate material can be greater than a size of the first self-healing particulate material.

A further embodiment of any of the foregoing methods, wherein a first portion of the fiber structure comprising the first region of the CMC preform can be infiltrated with the first slurry and a second portion of the fiber structure comprising the second region of the CMC preform can be infiltrated with the second slurry, and wherein the first and second portions of the fiber structure can overlap to form a third region of the fiber preform comprising both first and second self-healing particulate materials.

A further embodiment of any of the foregoing methods, wherein the first and second slurries can be mixtures of silicon carbide particulates and the first and second self-healing particulate materials, respectively, and wherein between 2 and 30 percent of the total particulate material by volume of the first slurry is the first self-healing particulate material, and wherein the between 5 and 30 percent of the total particulate material by volume of the second slurry is the second self-healing particulate material.

A further embodiment of any of the foregoing methods can further include densifying the CMC preform through chemical vapor infiltration.

A further embodiment of any of the foregoing methods, wherein depositing the first and second particulate materials in the CMC preform can include infiltrating a first fiber cloth with a first slurry comprising the first particulate material, infiltrating a second fiber cloth with a second slurry comprising the second particulate material, positioning the first fiber cloth to form at least a portion of the first region of the CMC preform, and positioning the second fiber cloth to form at least a portion of the second region of the CMC preform.

A ceramic matrix composite (CMC) component according to an exemplary embodiment of this disclosure, among other possible things comprises a first region comprising deposits of a first self-healing particulate material and a second region distinct from the first region and comprising deposits of a second self-healing particulate material having a different chemical composition than the first self-healing particulate material The CMC component of the preceding paragraph can optionally include, additionally and/or alternatively, any one or more of the following features, configurations, and/or additional components:

A further embodiment of the foregoing CMC component, wherein the first self-healing particulate material is selected from a group consisting of silicon boride, boron carbide, silicon borocarbide, silicon boronitrocarbide, and mixtures thereof, and wherein the second self-healing particulate material is selected from a group consisting of borides of rare earth elements, hafnium boride, zirconium boride, titanium boride, tantalum boride, silicides of rare earth elements, hafnium silicide, zirconium silicide, titanium silicide, tantalum silicide, molybdenum disilicide, aluminum oxide, alkaline metal oxides, oxide of rare earth elements and mixtures thereof.

A further embodiment of any of the foregoing CMC components, wherein the first region can comprise an inner core of the CMC preform and wherein the second region can comprise an outer region of the CMC preform including an outer surface of the CMC preform.

A further embodiment of any of the foregoing CMC components, wherein the first region can be located on a first side of the CMC component and wherein the second region can be located on a second side opposite the first side of the CMC component.

A further embodiment of any of the foregoing CMC components, wherein the deposits of the first and second self-healing particulate materials can be dispersed throughout a matrix of the CMC component and make up 0.5 to 25 percent of the matrix by volume.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for forming a self-healing ceramic matrix composite (CMC) component, the method comprising:
   depositing a first self-healing particulate material in a first region of a CMC preform of the CMC component, wherein the first self-healing particulate material is capable of sealing cracks in the matrix;
   depositing a second self-healing particulate material in a second region of the CMC preform, wherein the second self-healing particulate material is capable of regenerating an environmental barrier coating and wherein the first and second regions are non-overlapping and the second self-healing particulate material is absent from the first region;
   wherein the first and second self-healing particulate materials have different chemical compositions; and
   wherein the CMC preform is a fiber structure having the first and second regions and wherein depositing the first and second self-healing particulate materials in the CMC preform comprises:
      infiltrating the fiber structure with a first slurry comprising the first self-healing particulate material; and
      infiltrating the fiber structure with a second slurry comprising the second self-healing particulate material; and
      densifying the first and second regions with a ceramic matrix through chemical vapor infiltration following the steps of depositing the first and second self-healing particulate materials.

2. The method of claim 1, wherein the first self-healing particulate material is selected from a group consisting of silicon boride, boron carbide, silicon borocarbide, silicon boronitrocarbide, aluminum nitride and mixtures thereof, and wherein the second self-healing particulate material is selected from a group consisting of borides of rare earth elements, hafnium boride, zirconium boride, titanium boride, tantalum boride, silicides of rare earth elements, hafnium silicide, zirconium silicide, titanium silicide, tantalum silicide, molybdenum disilicide, aluminum oxide, alkaline metal oxides, oxide of rare earth elements, hafnium oxide and zirconium oxide and mixtures thereof.

3. The method of claim 2, wherein the first region comprises an inner core of the CMC preform, and wherein the second region comprises an outer region of the CMC preform including an outer surface of the CMC preform.

4. The method of claim 3, and further comprising depositing the first self-healing particulate material in the second region.

5. The method of claim 2, wherein the first region is located on a first side of the CMC preform and wherein the second region is located on a second side opposite the first side of the CMC preform, and wherein the second side of the CMC preform is configured for use in a high temperature environment and wherein the first side of the CMC preform is configured for use in a lower temperature environment.

6. The method of claim 2, and further comprising depositing the first and second self-healing particulate materials in a third region of the CMC preform located between the first and second regions of the CMC preform.

7. The method of claim 1, wherein the entire fiber structure is infiltrated with the first slurry and wherein the method further comprises removing the first slurry from the second region before infiltrating the fiber structure with the second slurry.

8. The method of claim 1, wherein the entire fiber structure is infiltrated with the first slurry and dried before infiltrating the fiber structure with the second slurry.

9. The method of claim 8, wherein a size of the second self-healing particulate material is greater than a size of the first self-healing particulate material, and wherein the size of the second self-healing particular material limits a penetration depth into the fiber structure.

10. The method of claim 1, wherein a first portion of the fiber structure comprising the first region of the CMC preform is infiltrated with the first slurry and a second portion of the fiber structure comprising the second region of the CMC preform is infiltrated with the second slurry, and wherein the first and second portions of the fiber structure overlap to form a third region of the fiber preform comprising both first and second self-healing particulate materials.

11. The method of claim 1, wherein the first and second slurries comprise mixtures of silicon carbide particulates and the first and second self-healing particulate materials, respectively, and wherein between 2 and 30 percent of the total particulate material by volume of the first slurry is the first self-healing particulate material, and wherein between 5 and 30 percent of the total particulate material by volume of the second slurry is the second self-healing particulate material.

12. The method of claim 1, wherein between 5 and 30 percent of the total particulate material by volume of the first slurry is the first self-healing particulate material, and wherein between 10 and 30 percent of the total particulate material by volume of the second slurry is the second self-healing particulate material.

* * * * *